United States Patent
Lee et al.

(10) Patent No.: US 10,069,127 B2
(45) Date of Patent: Sep. 4, 2018

(54) POROUS SEPARATION FILM FOR SECONDARY BATTERY INCLUDING CELLULOSE FIBER AND SILICA, AND METHOD FOR MANUFACTURING SAME

(71) Applicant: Korea Forest Research Institute, Seoul (KR)

(72) Inventors: Sun Young Lee, Seoul (KR); Sang Young Lee, Chuncheon-si (KR); Sang Jin Chun, Namyangju-si (KR); Sang Bum Park, Seoul (KR); Don Ha Choi, Seoul (KR)

(73) Assignee: Korea Forest Research Institute, Seoul (KR)

( * ) Notice: Subject to any disclaimer, the term of this patent is extended or adjusted under 35 U.S.C. 154(b) by 294 days.

(21) Appl. No.: 14/649,623

(22) PCT Filed: Jan. 8, 2013

(86) PCT No.: PCT/KR2013/000131
§ 371 (c)(1),
(2) Date: Jun. 4, 2015

(87) PCT Pub. No.: WO2014/088151
PCT Pub. Date: Jun. 12, 2014

(65) Prior Publication Data
US 2015/0333306 A1  Nov. 19, 2015

(30) Foreign Application Priority Data
Dec. 5, 2012  (KR) ........................ 10-2012-0140511

(51) Int. Cl.
*H01M 6/16* (2006.01)
*H01M 2/16* (2006.01)
(Continued)

(52) U.S. Cl.
CPC ............ *H01M 2/1626* (2013.01); *B29D 7/01* (2013.01); *C08J 5/18* (2013.01); *H01M 2/145* (2013.01);
(Continued)

(58) Field of Classification Search
None
See application file for complete search history.

(56) References Cited

U.S. PATENT DOCUMENTS

2007/0207692 A1* 9/2007 Ono ........................ B01D 39/18
442/327
2010/0297490 A1* 11/2010 Takami ............... H01M 2/1633
429/131

FOREIGN PATENT DOCUMENTS

JP   11-009976    1/1999
JP   2005-190736  7/2005
(Continued)

OTHER PUBLICATIONS

International Search Report dated Jun. 26, 213 From the Korean Intellectual Property Office Re. Application No. PCT/KR2013/000131 and Its Translation Into English.
(Continued)

*Primary Examiner* — Eli S Mekhlin

(57) ABSTRACT

The present invention relates to a composite separation film comprising cellulose fiber and silica, a method for manufacturing the separation film, and a secondary battery including the separation film, wherein the separation film has excellent thermal stability, dimensional stability, wettability and electrochemical stability and has a simplified manufacturing process such that the unit cost of production can be reduced.

5 Claims, 10 Drawing Sheets

(51) Int. Cl.
  *H01M 10/0525* (2010.01)
  *H01M 10/0566* (2010.01)
  *C08J 5/18* (2006.01)
  *H01M 2/14* (2006.01)
  *B29D 7/01* (2006.01)
  *H01M 10/052* (2010.01)
  *B01D 71/10* (2006.01)
  *B01D 67/00* (2006.01)
  *B01D 69/14* (2006.01)
  *B01D 71/02* (2006.01)

(52) U.S. Cl.
  CPC ..... *H01M 2/1646* (2013.01); *H01M 10/0525* (2013.01); *H01M 10/0566* (2013.01); *B01D 67/0079* (2013.01); *B01D 69/148* (2013.01); *B01D 71/027* (2013.01); *B01D 71/10* (2013.01); *H01M 10/052* (2013.01); *H01M 2300/0028* (2013.01)

(56) References Cited

FOREIGN PATENT DOCUMENTS

| | | |
|---|---|---|
| JP | 2006-316128 | 11/2006 |
| JP | 2007-335294 | 12/2007 |
| JP | 2010-202987 | 9/2010 |
| JP | 2012-007247 | 1/2012 |
| JP | 2012-232518 | 11/2012 |
| KR | 10-1040572 | 6/2011 |
| KR | 10-1164650 | 7/2012 |
| KR | 10-2012-0121623 | 11/2012 |
| KR | 10-2012-0125400 | 11/2012 |
| WO | WO 2008/139619 | 11/2008 |
| WO | WO 2009/119262 | 10/2009 |
| WO | WO 2014/088151 | 6/2014 |

OTHER PUBLICATIONS

Supplementary European Search Report and the European Search Opinion dated Jul. 27, 2016 From the European Patent Office Re. Application No. 13861148.8.

Notice of Reasons for Refusal dated Jun. 29, 2016 from the Japanese Patent Office Re. Application No. 2015-546723.

* cited by examiner

POROUS SEPARATION FILM FOR SECONDARY BATTERY INCLUDING CELLULOSE FIBER AND SILICA, AND METHOD FOR MANUFACTURING SAME

RELATED APPLICATIONS

This application is a National Phase of PCT Patent Application No. PCT/KR2013/000131 having International filing date of Jan. 8, 2013, which claims the benefit of priority of Korean Patent Application No. 10-2012-0140511 filed on Dec. 5, 2012. The contents of the above applications are all incorporated by reference as if fully set forth herein in their entirety.

BACKGROUND

Field of the Invention

The present invention relates to a composite separation film including a cellulose fiber and a silica, and a method for manufacturing the same.

Background Art

A lithium secondary battery receives attention as a main mobile energy source of a ubiquitous era, and is a very promising field where application thereof from an existing power source for IT equipment, such as a cellular phone, a PDA, and a notebook computer, to a current mass capacity high power field, such as power tools, hybrid electric vehicles (HEV)/plug-in hybrid electric vehicles (PHEV), and energy storage systems, are rapidly expanding, and a market scale thereof is expected to reach about 21 trillion won by about 2020.

According to an increase in capacity of the lithium secondary battery and continuous expansion of application to the mass capacity high power field such as power tools, robots, and electric vehicles, importance regarding safety of the battery, such as explosion or ignition of the battery, has received large attention. It can be said that an issue regarding safety of the battery is, while considering that the lithium secondary battery is an important future energy source of the ubiquitous era, a core matter that should be surely solved for continuous development of the battery.

Up to now, in the lithium secondary battery, a polyolefin-based material has been used as a separation film material, but due to a material characteristic and a characteristic of a manufacturing process including stretching, severe thermal shrinkage is exhibited at a temperature of 100° C. or more, and a drawback where the lithium secondary battery is physically and easily broken by internal impurities of the battery, such as metal particles, is exhibited, and thus the polyolefin-based material is understood as an ultimate cause incurring an internal short circuit of the battery.

Meanwhile, since the polyolefin-based separation film shows hydrophobicity due to the material characteristic, the polyolefin-based separation film has low affinity with an electrolyte that is polar, and thus it is difficult for the electrolyte to penetrate the polyolefin-based separation film, which may cause a possibility of liquid leakage to the outside of the battery, and an impregnation property of electrolyte is low to negatively affect final performance of the battery. This phenomenon is more remarkably exhibited in an applied field requiring high power, such as a battery for an electric vehicle.

Therefore, there is an earnest demand for development of a next-generation separation film where thermal/mechanical stability, affinity to the electrolyte, and the like, which are basic drawbacks of the existing polyolefin-based separation film, are improved, and research thereof may become an epoch-making plan advancing development of a lithium secondary battery with high stability and performance.

SUMMARY OF THE INVENTION

Technical Problem

The present invention has been made in an effort to provide a separation film including a cellulose fiber and a silica, a method for manufacturing the same, and a secondary battery including the separation film.

Technical Solution

An exemplary embodiment of the present invention provides a composite separation film including: a cellulose fiber; and a silica, and a secondary battery including the separation film.

Another exemplary embodiment of the present invention provides a method for manufacturing a separation film, including: a process of manufacturing a sheet by using a solution including a cellulose fiber, a silica, and an organic solvent or a mixture solution of water and the organic solvent; and a process of forming fine pores by removing the organic solvent or the mixture solution of water and the organic solvent included in the sheet.

Effect of the Invention

As described above, a separation film including a cellulose fiber and a silica according to the present invention has excellent thermal stability, dimensional stability, wettability, and electrochemical stability, and a manufacturing process thereof is simplified, and thus it is possible to reduce a production cost.

DETAILED DESCRIPTION OF THE INVENTION

Figure 1:
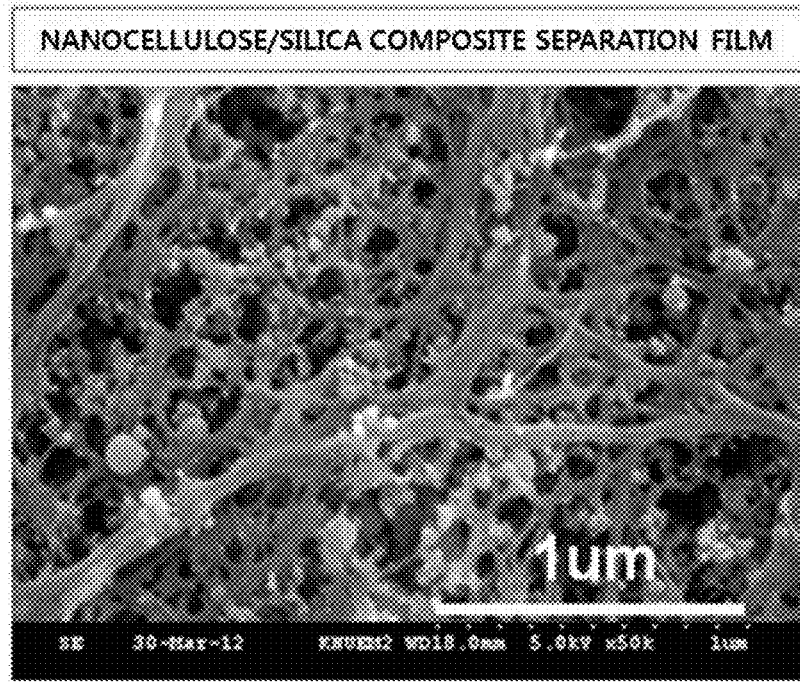
FIG. 1 is a scanning electron microscope (SEM) picture of a separation film for a secondary battery according to one exemplary embodiment of the present invention.

A separation film according to one exemplary embodiment of the present invention includes a cellulose fiber and a silica. Cellulose is one of biopolymer materials that are most plentiful on earth, and has merits in that cellulose can be regenerated, has high tensile strength and low density, and is biodegradable. Further, the cellulose fiber has properties such as a high ground surface area and a high aspect ratio (L/D). For example, the separation film according to the present invention may have a structure where silica nanoparticles are dispersed in cellulose nanofibers.

In the present invention, as a novel attempt to improve performance of the cellulose separation film, complexation of cellulose/silica nanoparticles is tried under various composition and process conditions. Specifically, the silica particles are dispersed in a layer including the cellulose fiber to manufacture the separation film, and it is confirmed that in the composite separation film thus manufactured, holes are significantly enlarged. This is because the silica particles exist between the cellulose fibers to prevent agglomeration of the fibers. The present invention draws a hole structure where the degree of porosity is significantly improved as compared to an existing cellulose separation film by complexation of the cellulose fibers and the silica particles.

The shape or the state of the silica is not particularly limited, but the separation film may have a structure where silica is dispersed in a particle state. Further, the content of the silica dispersed in the separation film is not particularly limited as long as the content is in the range where physical properties of the separation film are not reduced. As an example, the content of the silica may be 0.5 to 20 parts by weight, 1 to 15 parts by weight, 3 to 12 parts by weight, 1 to 10 parts by weight, 7 to 12 parts by weight, or 3 to 7 parts by weight, based on 100 parts by weight of the entire separation film. By adjusting the content of the silica to the aforementioned range, the thickness of the separation film may be prevented from being excessively increased, and excellent air permeability and high electric conductivity may be implemented.

The size of the cellulose fiber according to the present invention is not particularly limited, and in one exemplary embodiment, an average thickness of the cellulose fiber may be in the range of 10 to 100 nm. For example, the average thickness of the cellulose fiber may be in the range of 10 to 80 nm, 30 to 100 nm, 20 to 80 nm, or 20 to 60 nm. The thickness range of the cellulose fiber is provided to form the pore having the sufficient size and implement the uniform surface. For example, in the case where the average thickness of the cellulose fiber is excessively large, the surface of the manufactured separation film may not be uniform and strength of the separation film may be small.

Further, the diameter of the silica is not particularly limited as long as the diameter is in the range where the silica is dispersed in the cellulose fiber, and in one exemplary embodiment, the average diameter of the silica may be in the range of 10 to 500 nm. For example, the average diameter of the silica may be in the range of 10 to 400 nm, 30 to 500 nm, 30 to 200 nm, or 50 to 150 nm. By adjusting the diameter of the silica to the aforementioned range, the thickness of the separation film may be prevented from being excessively increased, and a sufficient hole size may be secured.

The average thickness of the separation film may be in the range of 15 to 40 μm. For example, the average thickness of the separation film may be 21 to 40 μm, 25 to 40 μm, 28 to 37 μm, 30 to 40 μm, or 32 to 36 μm. The thickness of the separation film is provided to secure physical strength to prevent stability of the battery from being reduced. Further, in the case where the thickness of the separation film is excessively large, resistance of the separation film may be increased and air transmittance may be reduced, thereby reducing efficiency of the battery.

The separation film may have an air permeability value (Gurley value) in the range of 150 to 350 s/100 cc·air. For example, the air permeability value may be in the range of 350 s/100 cc·air or less, 250 to 350 s/100 cc·air, 270 to 340 s/100 cc·air, 280 to 340 s/100 cc·air, or 260 to 290 s/100 cc·air. In the present invention, the air permeability value (Gurley value) is an index regarding air transmittance of the separation film, and is determined in accordance with a Gurley-type air transmittance (JIS P8117) standard. Generally, it can be said that the smaller the air permeability value is, the better the air transmittance is. The air permeability value may be described by the following Equation 1.

$$tG = K \cdot (\tau^2 \cdot L)/(\varepsilon \cdot d) \quad \text{[Equation 1]}$$

In the aforementioned Equation, tG represents the air permeability value (Gurley value), K represents a proportional constant, τ represents tortuosity (average of the values obtained by dividing a tortuous path length by a separation film thickness with respect to a predetermined tortuous path), L represents the separation film thickness, ε represents porosity, and d represents an average pore diameter.

Based on Equation 1, it can be seen that in order to allow the separation film to have high air transmittance, it is advantageous to set the separation film thickness to be small and porosity and the average pore diameter to be large.

Further, the separation film according to the present invention has excellent thermal stability and ionic conductivity.

In one exemplary embodiment, thermal shrinkage of the separation film is 5% or less in a state where the separation film is left at 150° C. for 30 minutes. For example, thermal shrinkage of the separation film may be more than 0% and 5% or less, 3% or less, 1.5% or less, or 0.5% or less, in a state where the separation film is left at 150° C. for 30 minutes. Through various experiments, it is confirmed that the separation film according to the present invention is not substantially shrunk by heat under the aforementioned condition.

In another exemplary embodiment, in a state where the separation film is impregnated in the electrolyte including the lithium salt and the carbonate-based solvent, ionic conductance may be in the range of 1.2 to 1.5 S. Before the composite separation film where the silica particles are dispersed in the cellulose fiber is applied to the lithium secondary battery, the separation film where the electrolyte is impregnated is put into a coin cell to measure ionic conductivity. However, there is a problem in that since the thicknesses of the composite separation films are different from each other, precise comparison cannot be performed. In order to supplement this, ionic conductance directly relating to performance of the battery when the separation film is applied to the actual battery is calculated. Ionic conductance is used as an index representing how well the separation films having different thicknesses actually transfer lithium ions. As a calculation result, in a state where the separation film according to the present invention is impregnated in the electrolyte including the lithium salt and the carbonate-based solvent, ionic conductance is in the range of 1.2 to 2 S. For example, in a state where the separation film is impregnated in the electrolyte including the lithium salt and the carbonate-based solvent, ionic conductance may be in the range of 1.3 to 1.9 S, 1.3 to 1.7 S, or 1.5 to 1.7 S. By comparing the existing polyolefin-based separation film and the separation film manufactured by using the cellulose fiber alone, relatively high ionic conductance is provided. The carbonate-based electrolyte is not particularly limited, and may include one kind or more of ethylene carbonate, propylene carbonate, dimethyl carbonate, ethylmethyl carbonate, and diethyl carbonate. For example, the ionic conductance may be a result measured by impregnating the separation film in the electrolyte manufactured by adding 1 mole of the lithium salt ($LiPF_6$) to a solution where ethylene carbonate and dimethyl carbonate are mixed at a ratio of 1:1.

Further, the present invention provides a method for manufacturing the aforementioned separation film.

In one exemplary embodiment, the manufacturing method may include a process of manufacturing a sheet by using a solution including a cellulose fiber, a silica, and an organic solvent or a mixture solution of water and the organic solvent; and a process of forming fine pores by removing the organic solvent or the mixture solution of water and the organic solvent included in the sheet.

In the manufacturing method, the organic solvent or the mixture solution of water and the organic solvent is used as a dispersion solvent for dispersing the cellulose fiber and the silica. Porosity and the thickness of the separation film and the like may be adjusted to a desired level by adjusting a mixing ratio of the dispersion solvent. For example, the organic solvent may be used alone, or the mixing ratio of the organic solvent and water, in which water is mixed at a volume ratio of more than 0 and 100 or less based on 100 volumes of the organic solvent, may be in the range of 50:50 to 100:0 (volume ratio). Therefore, the present invention includes adjustment of the organic solvent and water to the aforementioned range, or use of the organic solvent not including water.

The organic solvent is not particularly limited in the case where in a process of manufacturing a suspension including the cellulose fiber and the silica, the cellulose fiber and the silica are uniformly dispersed and the cellulose fiber and the silica are not dissolved. Examples of the organic solvent may include one kind or more of methyl alcohol, ethyl alcohol, propyl alcohol, acetone, ethyl acetate, methylethylketone, toluene, and heptane. Isopropyl alcohol may be used as the organic solvent. In this case, it is possible to manufacture the sheet by dispersing the cellulose fiber and the silica in isopropyl alcohol alone or a solution where water and isopropyl alcohol are mixed.

Specifically, the process of manufacturing the sheet may include a process of impregnating the cellulose fiber into the solution including the silica and the organic solvent or the mixture solution of water and the organic solvent to manufacture the sheet. For example, the process of manufacturing the sheet may include a process of passing the solution including the cellulose fiber, the silica, and the organic solvent or the mixture solution of water and the organic solvent through a homogenizer to manufacture a suspension, and performing pressure reduction to manufacture the sheet. The manufactured sheet has high tensile strength by forming a strong hydrogen bond between the cellulose fibers. The number of passage through the homogenizer may be 8 cycles or more. For example, the number of passage through the homogenizer may be 8 to 20 cycles, 10 to 15 cycles, or 12 cycles. As the number of passage of the solution including the cellulose fiber and the silica through the homogenizer is increased, the solution is uniformly dispersed in a dispersion solution. Specifically, in the process of passing the solution through the homogenizer, high shear force and impact force are applied to a bundle of cellulose fibers. Then, while the pressure is reduced from a high pressure to a normal pressure, the cellulose fibers having a predetermined size are uniformly arranged by mechanical force, and the silica is uniformly dispersed between the arranged cellulose fibers, thereby providing more uniform porosity.

Further, the manufacturing method may further include, after the process of forming the fine pores, a process of drying the manufactured sheet. The process of drying the sheet may be performed at a temperature of 40° C. to 80° C. for 10 hours to 30 hours. For example, the process of drying the sheet may be performed at a temperature of 50 to 70° C. for 20 to 30 hours. Through the drying process, the dispersion solution contained in the cellulose fibers and the silica is removed, and a portion from which the dispersion solution is removed forms a pore. The process of drying the sheet may include a process of performing dewatering and drying by using a pressure-reduction filtration apparatus, and is not limited to the aforementioned method.

The present invention provides a secondary battery including the aforementioned separation film. The structure of the secondary battery is not particularly limited, and may be used in all batteries such as a rectangle type, a cylinder type, a pouch type, and a coin type. Further, an active material used in an anode and a cathode is not particularly limited. For example, the secondary battery may be a lithium secondary battery using lithium as an active material.

EXAMPLES

Hereinafter, the present invention will be described in more detail through Examples according to the present invention and the like, but the scope of the present invention is not limited thereby.

Examples 1 to 3: Manufacturing of Separation Film Including Cellulose Fiber and Silica The cellulose fiber was mixed with the dispersion solvent including the silica. The content of the used silica is described in the following Table 1, and the organic solvent and water were mixed at the ratio of 95:5 (v/v) to be used as the dispersion solvent. The content of the silica was calculated based on 100 parts by weight of the manufactured entire separation film. The mixture of the cellulose fiber, the silica, and the dispersion solvent was passed through the homogenizer by 12 cycles to manufacture the sheet. Then, the sheet was dried at 60° C. for 24 hours to manufacture the separation film.

TABLE 1

| No. | $SiO_2$ content (parts by weight) | Separation film thickness (μm) |
| --- | --- | --- |
| Example 1 | 1 | 28 |
| Example 2 | 5 | 35 |
| Example 3 | 10 | 37 |

Comparative Example 1: Manufacturing of Cellulose Fiber Separation Film not Including Silica The separation film was manufactured by the same method as Example 1, except that the silica was not added. The thickness of the manufactured separation film was measured to be 17 μm.

Comparative Example 2: Polyolefine-Based Separation Film

The commercialized celgard (celgard 2320 PP/PE/PP) separation film was purchased. The thickness of the separation film was measured to be 20 μm.

Experimental Example 1: Observation of Separation Film by Using Electron Microscope The separation films of Examples 1 to 3 and Comparative Examples 1 and 2 were observed by using the electron microscope.

Figure 2:
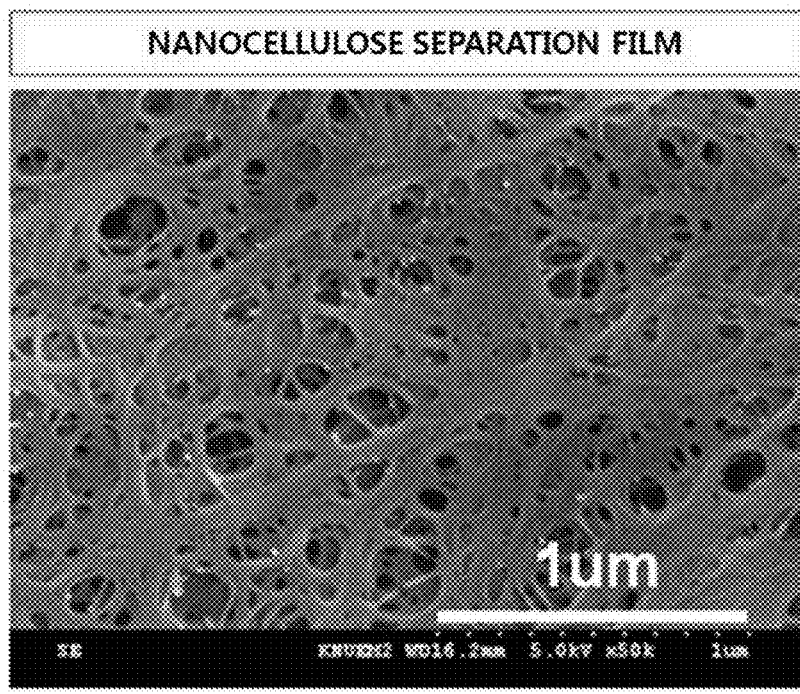
FIG. 2 is a scanning electron microscope picture of a separation film formed of only a cellulose fiber.

First, FIG. 1 is a result obtained by observing the separation film according to Example 1. Referring to FIG. 1, it can be seen that the silica particles are uniformly distributed between the cellulose fibers. On the other hand, FIG. 2 is a result obtained by observing the separation film according to Comparative Example 1. It can be confirmed that in the separation film of FIG. 1 (Example 1), as compared to FIG. 2 (Comparative Example 1), a hole of the separation film is enlarged. This is because the silica particles exist between the cellulose fibers to prevent agglomeration of the fibers. Thereby, through complexation of the cellulose fiber and the silica particles, as compared to the existing cellulose separation film, the separation film with the hole structure having improved porosity may be manufactured.

Figure 3:
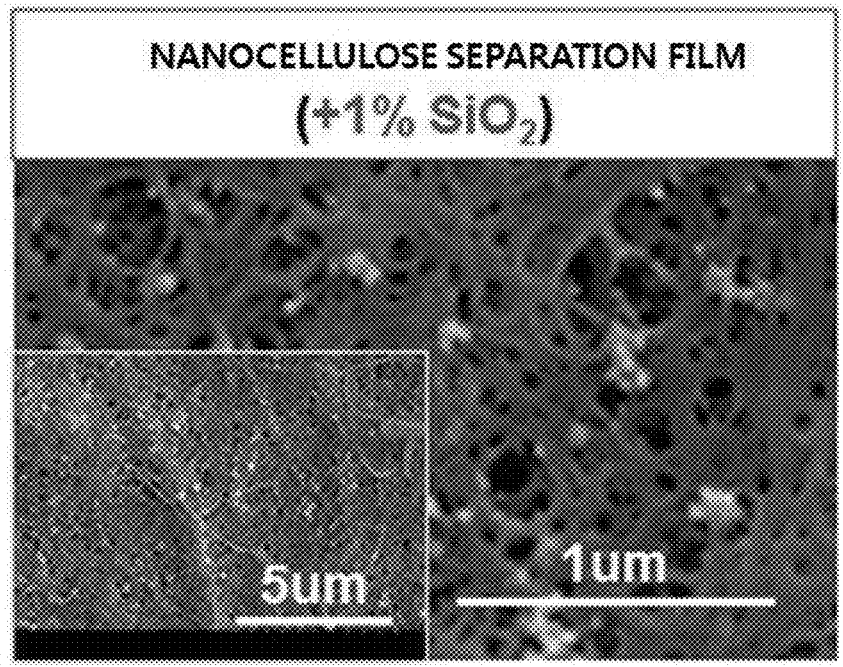
FIGS. 3, 4 and 5 each are scanning electron microscope pictures of the separation film for the secondary battery according to one exemplary embodiment of the present invention.
Figure 4:
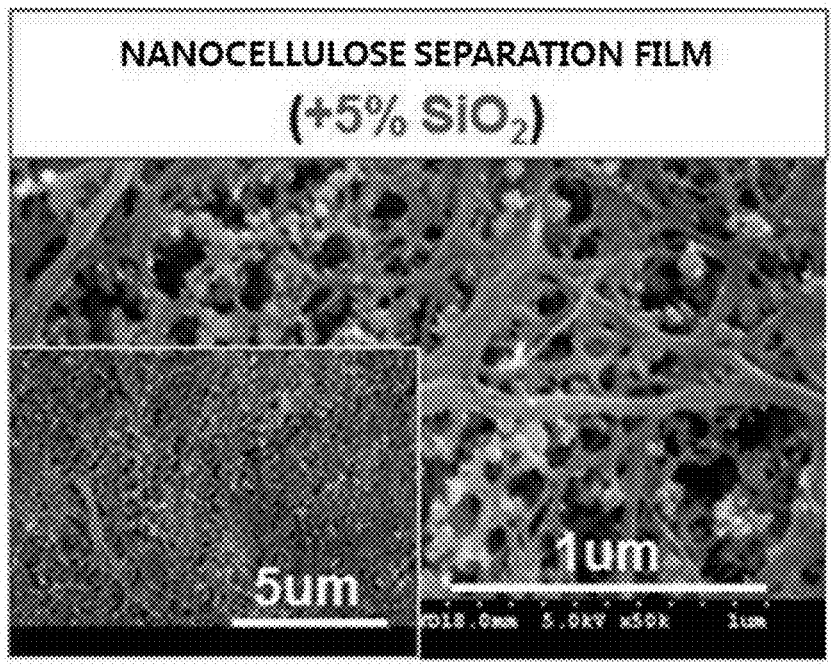
Figure 5:
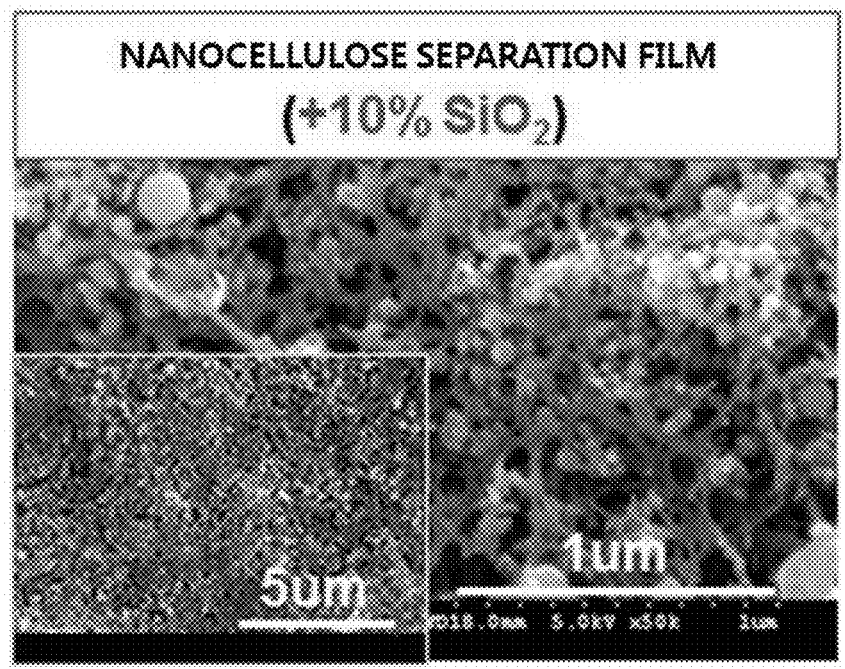
Figure 6:
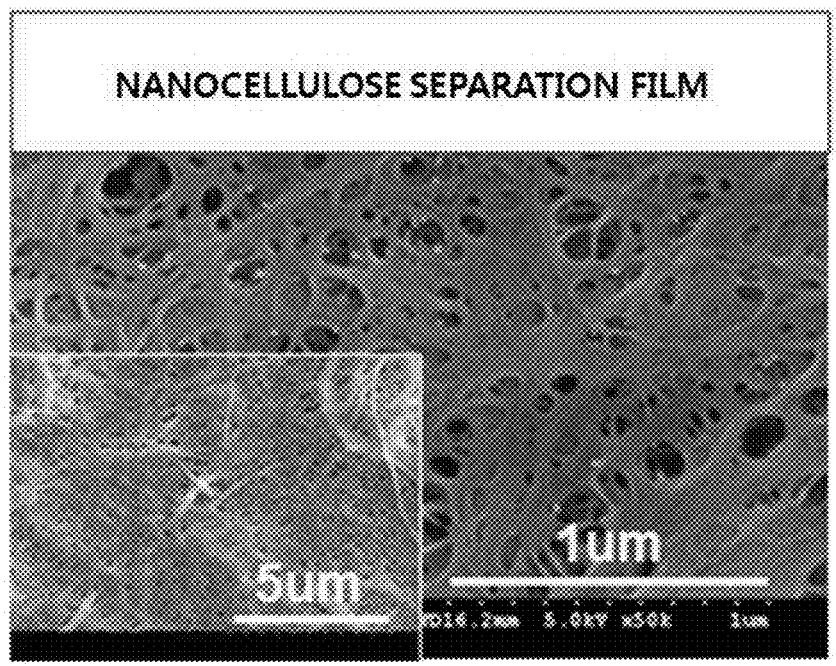
FIGS. 6 and 7 each are scanning electron microscope pictures of an existing separation film.
Figure 7:
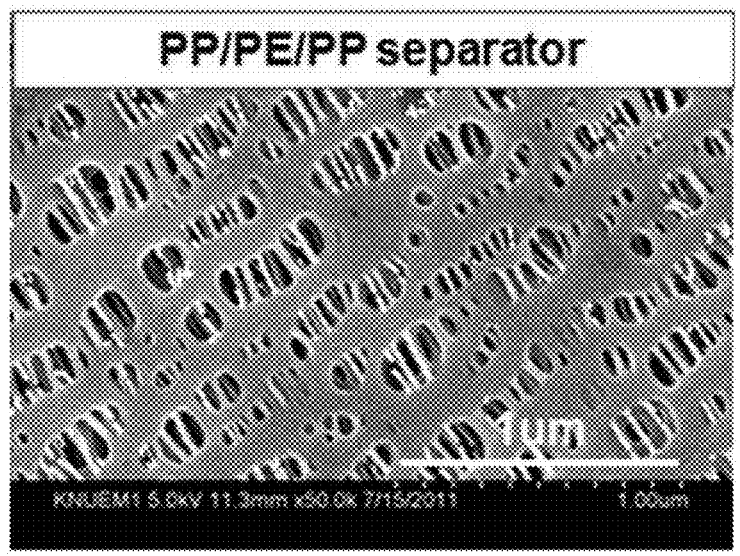

FIGS. 3, 4, 5, 6 and 7 sequentially illustrate results obtained by observing the separation films of Examples 1 to 3 and Comparative Examples 1 and 2 by the electron microscope. Referring to FIGS. 3, 4 and 5, as the addition amount of the silica particles was increased, many silica particles were observed on the surface of the separation film. It can be seen that as compared to the cellulose fiber separation film of FIG. 6 to which the silica particles are not added, more holes of the separation film are observed by adding the silica. It is judged that this is because the silica nanoparticles exist between the cellulose fibers and thus serve to prevent agglomeration of the fibers. Further, it can be seen that in the separation film (Comparative Example 2) of FIG. 7, the degree of formation of the holes is significantly low as compared to the other separation films.

Experimental Example 2: Evaluation of Thermal Stability of Separation Film

Figure 8:
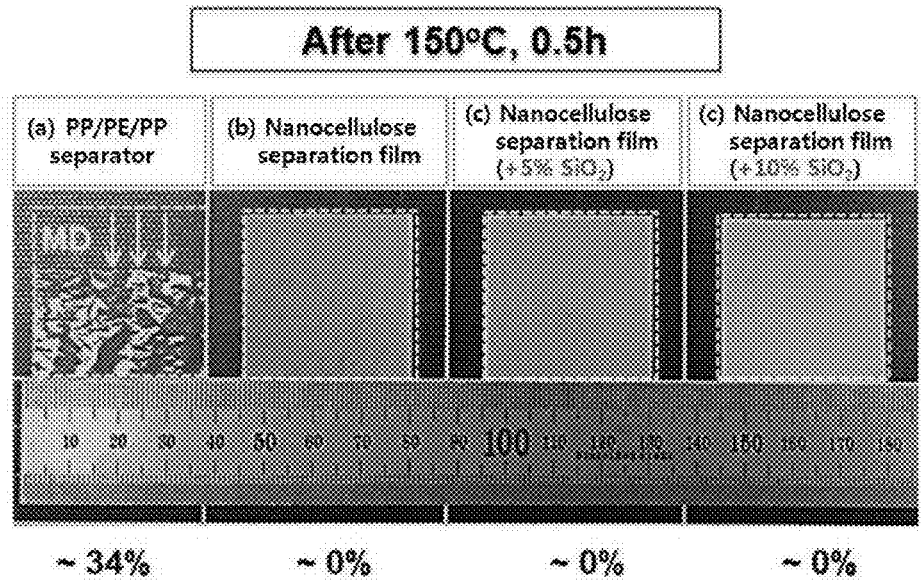
FIG. 8 is a picture illustrating an experiment result of thermal stability of the separation film.

The separation films of Examples 2 and 3 and Comparative Examples 1 and 2 were each exposed at 150° C. for 30 minutes. The results obtained by comparing and photographing the separation films before and after the separation films are exposed at 150° C. are illustrated in FIG. 8.

As the experimental result, it was confirmed that after the celgard separation film ((a) Comparative Example 2) was exposed to the temperature of 150° C., the dimension was reduced by about 36%. On the other hand, in the separation films ((c) Example 2 and (d) Example 3) according to the present invention, the change in dimension was hardly observed.

Figure 9:
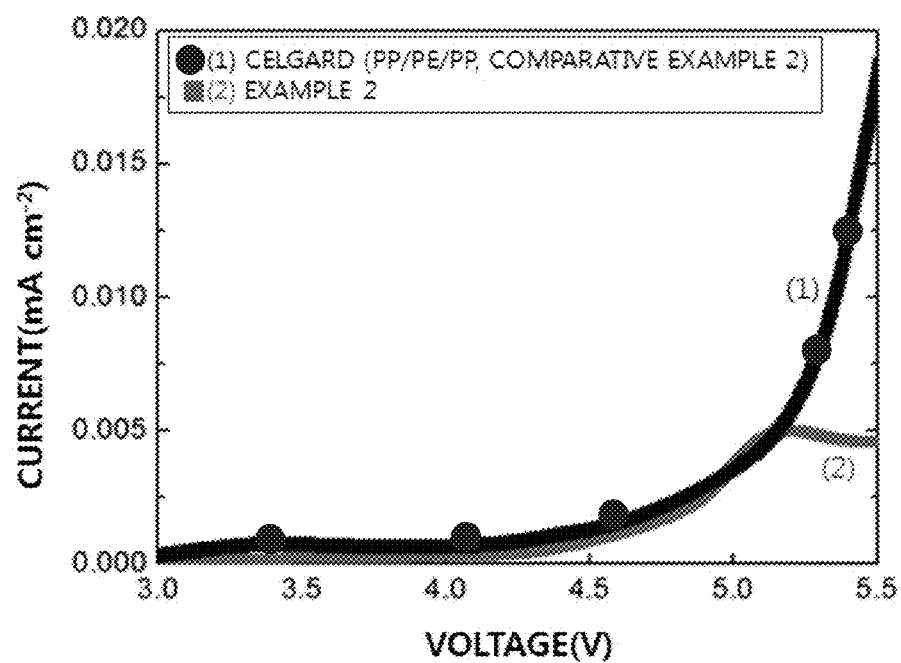
FIG. 9 is a graph illustrating an experiment result of electrochemical oxidation stability of the separation film.

Experimental Example 3: Evaluation of Electrochemical Stability of Separation Film In order to confirm electrochemical stability, while the voltage of each separation film manufactured in Example 2 and Comparative Example 2 was increased, the current density was measured. The result is illustrated in FIG. 9.

In both separation films, the rapid change in current density was not exhibited until about 4.6 V. It can be seen that since the voltage applied to the secondary battery is highest at 4.2 V, electrochemical stability does not matter significantly.

Experimental Example 4: Evaluation of Wettability of Electrolyte of Separation Film Wettability of the separation film for the secondary battery with respect to the electrolyte is one of properties largely affecting battery productivity and battery efficiency. Wettabilities of the electrolyte of the separation films of Examples 2 and 3 and Comparative Examples 1 and 2 were compared and measured.

Figure 10:
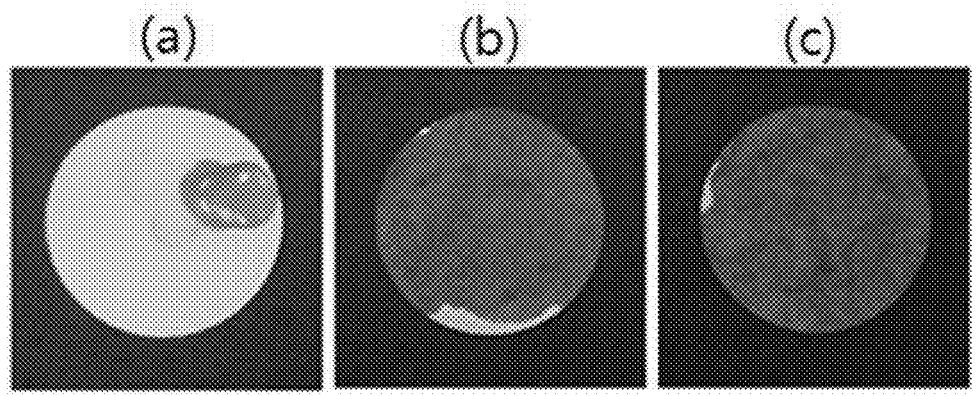
FIGS. 10 and 11 are pictures comparing experiment results of wettability of a polar electrolyte of the separation film.

First, after the propylene carbonate electrolyte having high polarity was dripped drop by drop on each separation film by using the microsyringe, the result was observed. The observation result is illustrated in FIG. 10. FIG. 10 is an observation result at a time point when 2 seconds passed after the propylene carbonate electrolyte is dripped. The separation film (PP/PE/PP separation film) of Comparative Example 2 was not wet by the electrolyte, and it was confirmed that the separation films of Comparative Example 1 and Example 2 were immediately wet as soon as the electrolyte was dripped. Comparing the separation films of Comparative Example 1 and Example 2 to each other, it can be seen that wettability of the separation film of Example 2 is relatively excellent.

Figure 11:
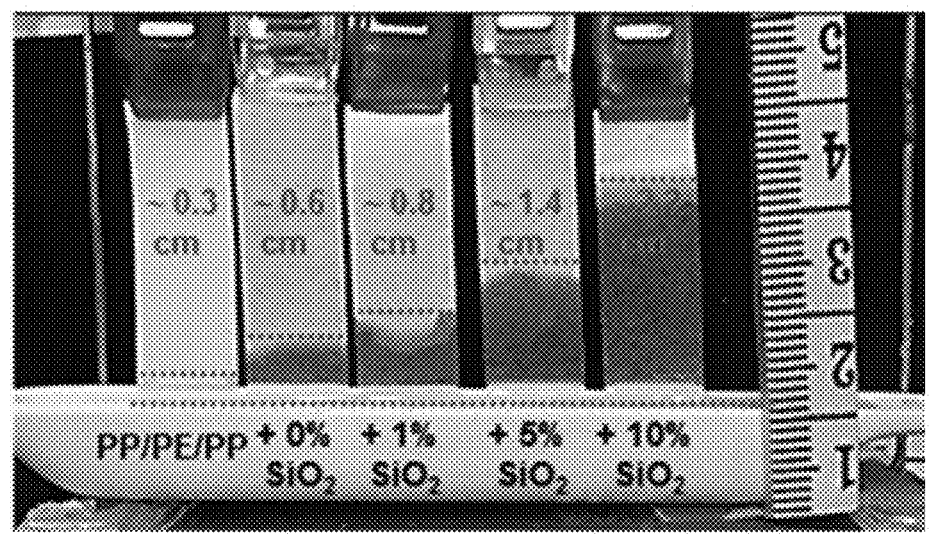

Next, the experiment where wettabilities of the separation films were quantitatively compared was performed. The propylene carbonate electrolyte was supplied to the separation films, and at the time point when 60 minutes passed, affinity with the electrolyte was quantitatively compared. The comparison result is illustrated in FIG. 11. Referring to FIG. 11, it can be seen that the separation films of Example 1 (+1% $SiO_2$), Example 2 (+5% $SiO_2$), and Example 3 (+10% $SiO_2$) are easily and rapidly wet by the polar electrolyte. Further, it can be seen that as the content of the silica is increased, the polar electrolyte is more strongly absorbed.

In this regard, it can be seen that the separation film (PP/PE/PP separation film) of Comparative Example 2 has a problem in that since the separation film has hydrophobicity, affinity with the electrolyte having polarity is low, and thus the separation film is not easily wet by the electrolyte, and it can be seen that the separation film (+0% $SiO_2$) of Comparative Example 1 has relatively low affinity with the electrolyte.

Experimental Example 5: Evaluation of Air Permeability of Separation Film

Air transmittance and the thickness of the separation films of Examples 1 to 3 and Comparative Examples 1 and 2 were calculated. Table 2 illustrates air transmittance and the thickness of the separation film. Air transmittance was represented by measuring the Gurley value. The Gurley value is a value (sec) of a time when 100 cc of air transmits the separation film, and an index widely used to quantitatively analyze the hole structure of the separation film. In the case where the holes of the separation film are formed well, air is smoothly transmitted, and thus the small Gurley value is exhibited.

TABLE 2

| No. | Gurley value | Separation film thickness (μm) |
| --- | --- | --- |
| Example 1 | 340 | 28 |
| Example 2 | 280 | 35 |
| Example 3 | 280 | 37 |
| Comparative Example 1 | 496 | 17 |
| Comparative Example 2 | 500 | 20 |

As seen in Table 2, as the content of the silica was increased, the Gurley value of the separation film was reduced. As compared to the separation film (Comparative Example 1) to which the silica was not added, when the silica was added in the content of 1% (Example 1), the biggest reduction in Gurley value was exhibited, and subsequently, as addition of the silica was increased, the Gurley value was further reduced. However, in the case of the separation film (Example 3) where the silica was added in the content of 10%, no large difference was exhibited as compared to the separation film (Example 2) where the silica was added in the content of 5%. From this, it can be seen that addition of the silica in the content of 10% does not develop the hole structure any more. Meanwhile, addition of the silica increased the thickness of the composite separation film. The thickness was continuously increased as the addition amount of the silica was increased, and thus the thickness was 37 μm when the silica was added in the content of 10%.

Experimental Example 6: Evaluation of Ionic Conductivity of Separation Film

Electric resistance, ionic conductivity, and ionic conductance of the separation films of Examples 1 to 3 and Comparative Examples 1 and 2 were calculated. Specifically, before the separation film where the silica was added in various contents was applied to the lithium secondary battery, the separation film impregnated in the electrolyte was put into the coin cell to measure ionic conductivity. As the ionic conductivity result, as the content of the silica particles was increased, the ionic conductivity value was increased. However, since the thicknesses of the separation films were different from each other, the separation films could not be precisely compared. Accordingly, ionic conductance directly relating to performance of the battery when the separation film was applied to the actual battery was obtained. Ionic conductance is used as an index representing how well the separation films having different thicknesses actually transfer lithium ions. The experiment result is described in Table 3.

TABLE 3

| No. | Resistance (Ohm) | Ionic conductivity (mScm$^{-2}$) | Ionic conductance (S) |
| --- | --- | --- | --- |
| Example 1 | 0.466 | 1.918 | 1.306 |
| Example 2 | 0.595 | 2.923 | 1.679 |
| Example 3 | 0.726 | 2.402 | 1.377 |
| Comparative Example 1 | 0.881 | 0.903 | 1.135 |
| Comparative Example 2 | 1.356 | 0.734 | 0.737 |

Reviewing Table 3, as the addition amount of the silica was increased, the ionic conductance value was increased. That is, ionic conductance of the separation film (Comparative Example 1) to which the silica was not added was 1.135 S, but the separation film (Example 2) to which the silica was added in the content of 5% had the highest ionic conductance of 1.679 S. On the other hand, it was confirmed that when the silica was added in the content of 10% (Example 3), ionic conductance was rather reduced. From this, it is considered that addition of the silica in the content of 10% or more spoils the hole structure of the separation film.

Experimental Example 6: Measurement of Change in Discharge Capacity According to Change in Current Density of Separation Film With respect to the separation films of Examples 1 to 3 and Comparative Examples 1 and 4, the change in discharge capacity according to the change in current density was measured. Specifically, the coin cells equipped with each separation film were charged with the current density of 0.2 C at the voltage of 3.0 V and 4.2 V. Then, when discharging was performed while the current density was changed from 0.1 C to 2.0 C, the change in discharge capacity of the coin cells was measured.

Figure 12:
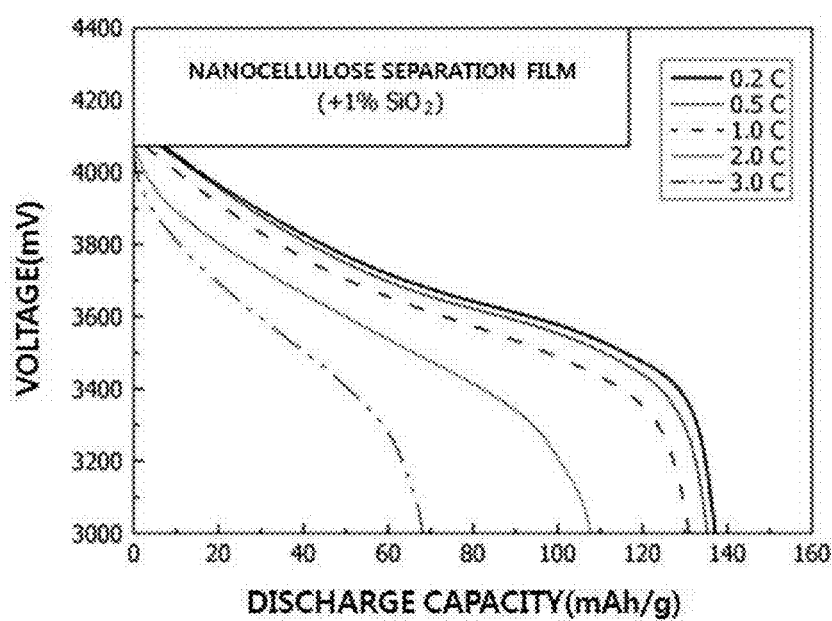
FIGS. 12, 13, 14, 15 and 16 are graphs illustrating a discharge capacity change according to a current density change of the battery to which the separation film is applied.
Figure 13:
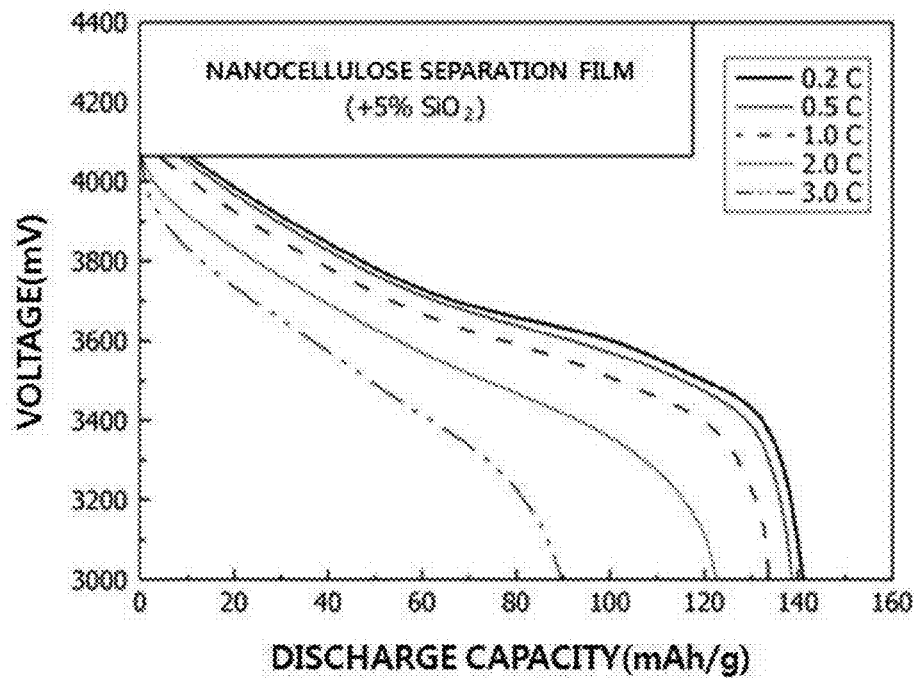
Figure 14:
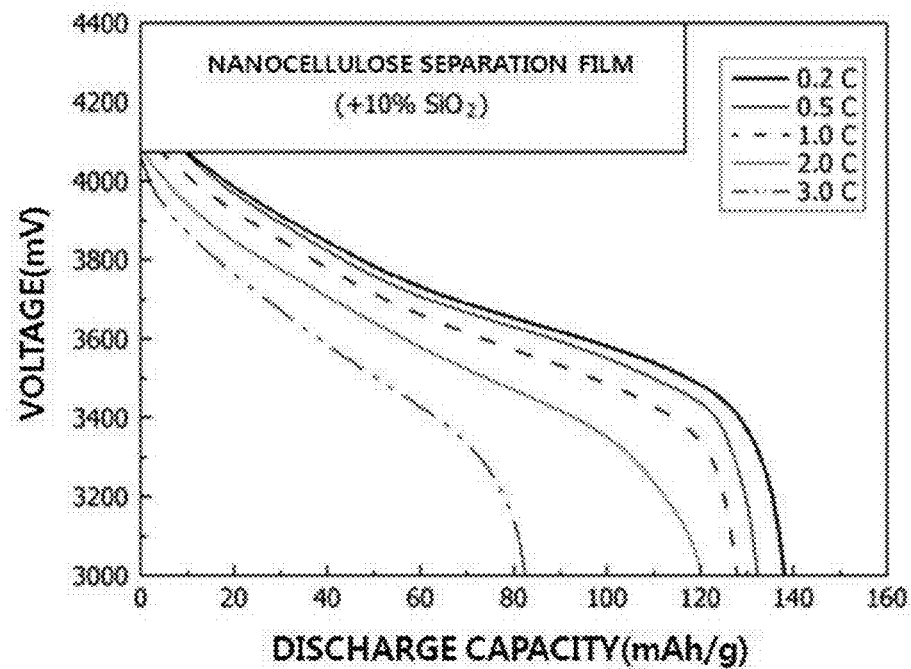
Figure 15:
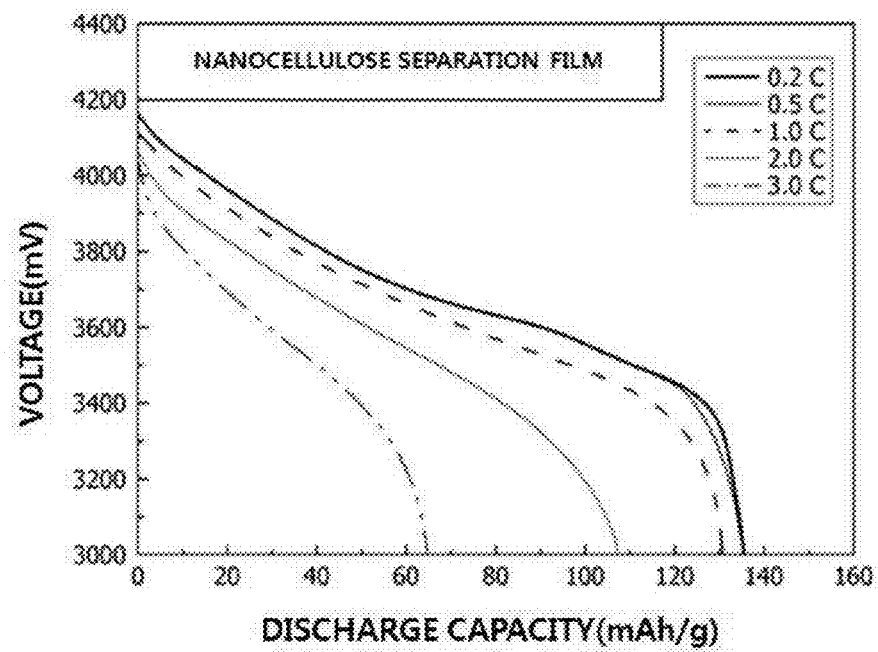
Figure 16:
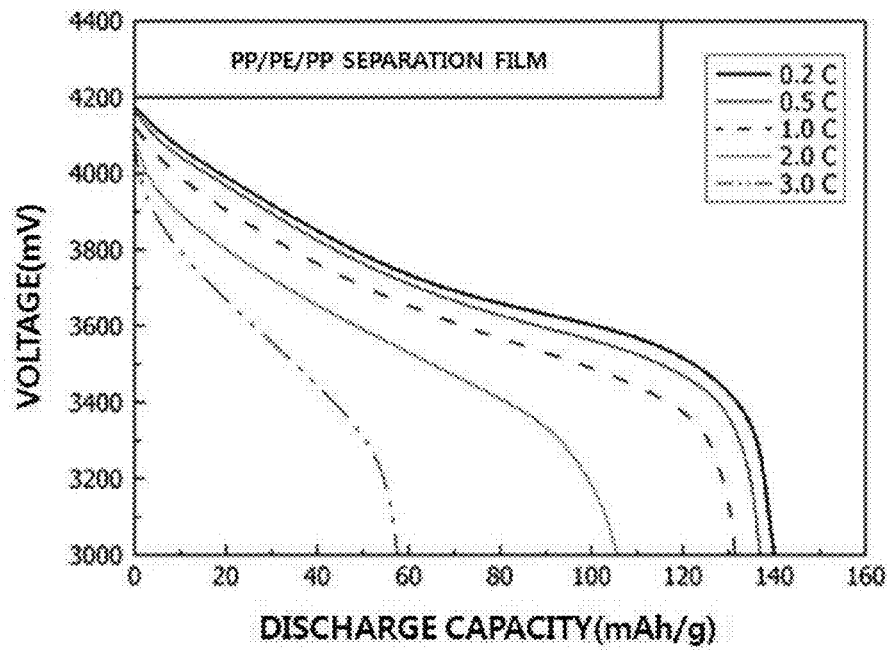

The measurement results for each separation film are illustrated in FIGS. 12, 13, 14, 15 and 16. Referring to FIGS. 12, 13 and 14, it can be seen that the rate-capability discharge property is improved according to the amount of the silica added when the cellulose/silica separation film is manufactured. In this regard, FIG. 15 is a rate-capability discharge graph of the separation film (Comparative Example 1) to which the silica is not added. It can be seen that as the limiting rate is increased, the discharge capacity is reduced. This phenomenon was also observed in FIG. 16 for the separation film of Comparative Example 2.

Figure 17:
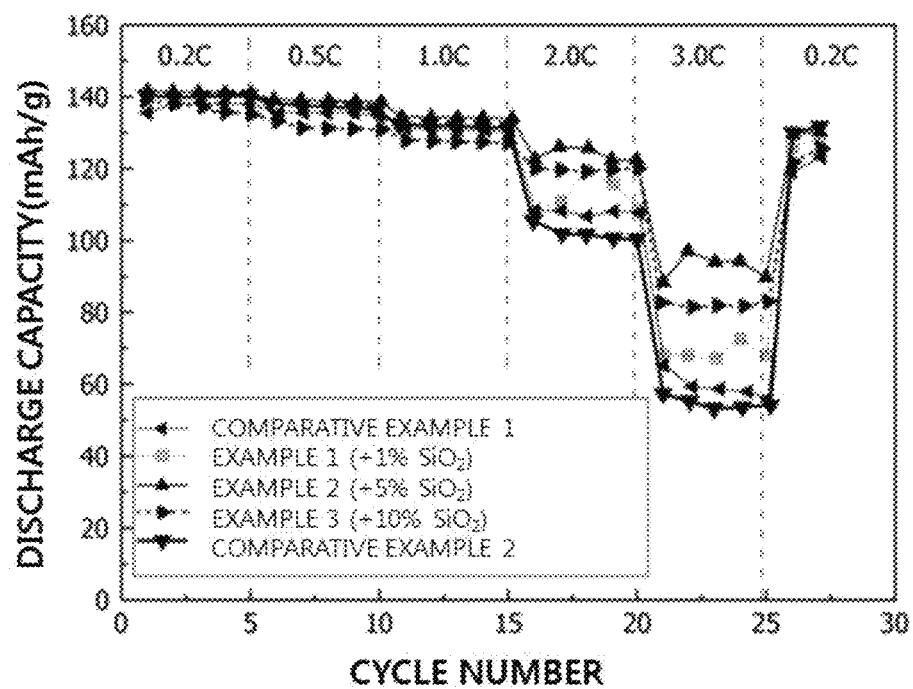
FIG. 17 is a graph illustrated by summarizing a rate-capability discharge capacity of the battery to which the separation film is applied.

Further, in FIG. 17, the rate-capability discharge capacity of the battery to which each separation film is applied is summarized to be illustrated as a graph. The rate-capability discharge property was improved as the addition amount of the silica was increased. The battery having the most excellent rate-capability discharge property is the separation film (Example 2) to which the silica was added in the content of 5%, and had the high discharge capacity of 120 mAh/g or more at the high limiting rate (2.0 C). On the other hand, the separation film (Comparative Example 1) to which the silica was not added had the discharge capacity (about 105 mAh/g) that was similar to that of the commercialized PP/PE/PP separation film (Comparative Example 2).

Experimental Example 7: Evaluation of Low Voltage Property of Separation Film

The low voltage property (open circuit voltage drop) of the coin cell manufactured by equipping the separation film was measured. The low voltage property provides information regarding self-discharging capable of expecting the internal short circuit between two electrodes of the secondary battery.

Figure 18:
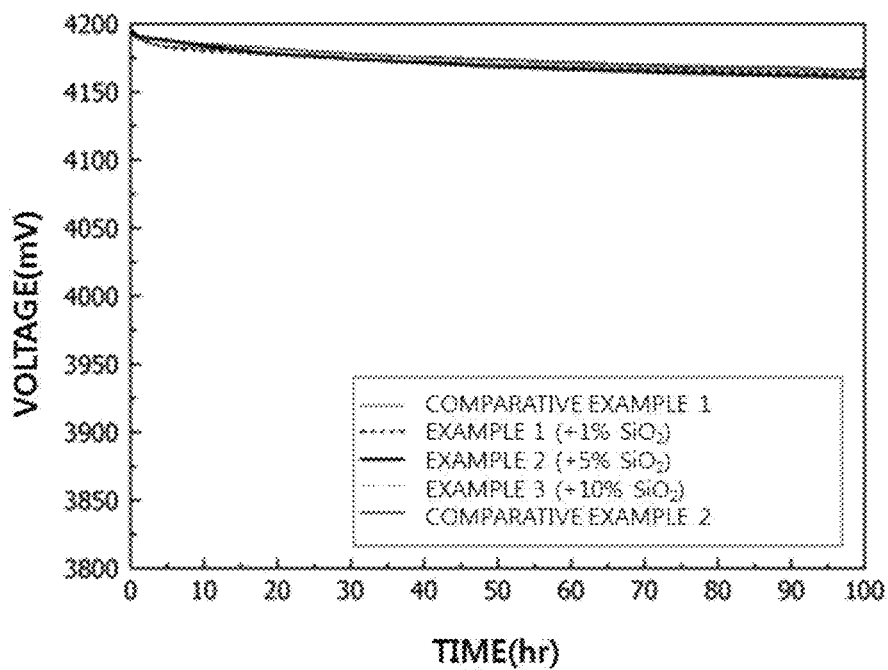
FIG. 18 is a graph comparing low voltage properties (open circuit voltage drop) of the battery to which the separation film is applied.

The low voltage phenomenon is a phenomenon that after the manufactured cell is charged to 4,200 mV, when the voltage is measured for each time in a state where the current is not applied, the charged voltage is not maintained but is reduced. This phenomenon is observed in the case where the hole of the separation film is very large, but in all of the separation films illustrated in FIG. 18, the low voltage phenomenon was not observed.

Experimental Example 8: Evaluation of Cycle Performance Property

Cycle performance of the coin cell manufactured by equipping the separation film was evaluated. Cycle performance was evaluated while the charge/discharge limiting rate was 1.0 C/1.0 C. The evaluation result is illustrated in FIG. 19.

Figure 19:
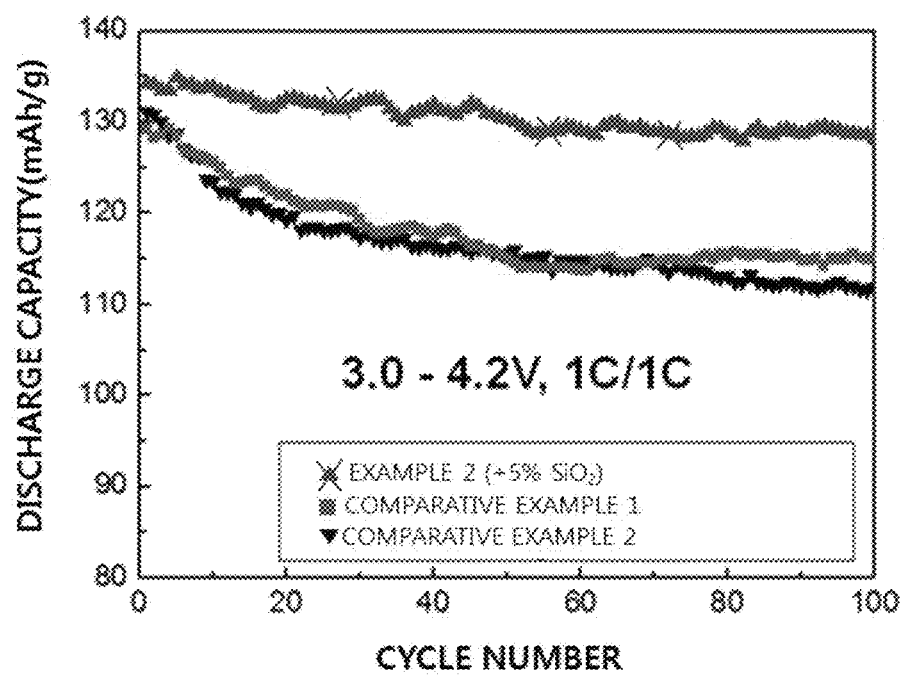
FIG. 19 is a graph comparing cycle properties of the battery to which the separation film is applied.

Referring to FIG. 19, the separation film (Example 2) to which the silica was added in the content of 5% had cycle performance that was more excellent than that of the separation film (Comparative Example 1) to which the silica was not added. Further, performance of the separation film (Example 2) was more excellent than performance of the commercialized PP/PE/PP separation film (Comparative Example 2). This difference in cycle performance is caused by high ionic conductance and excellent electrolyte affinity of the separation film of Example 2. Thereby, it was confirmed that cycle performance of the existing cellulose separation film was improved by adding the silica.

The separation film including the cellulose fiber and the silica according to the present invention has excellent thermal stability, dimensional stability, wettability, and electrochemical stability, and can be utilized in secondary batteries having various shapes and the like.

What is claimed is:

1. A method for manufacturing a separation film, comprising:
    a process of manufacturing a sheet by using a solution including a cellulose fiber, a silica, and an organic solvent or a mixture solution of water and the organic solvent;
    a process of forming fine pores by removing the organic solvent or the mixture solution of water and the organic solvent included in the sheet; and
    a process of drying the manufactured sheet at a temperature of 40° C. to 80° C. for 10 hours to 30 hours,
    wherein the silica is in a particle-type state, and a content of the silica is 3 to 7 parts by weight based on 100 parts by weight of the entire separation film,
    wherein an air permeability value of the separation film according to JIS P8117 is 150 to 350.

2. The method of claim 1, wherein in the organic solvent or the mixture solution of water and the organic solvent, the organic solvent is used alone, or water is mixed at a volume ratio of more than 0 and 100 or less based on 100 volume of the organic solvent.

3. The method of claim 1, wherein the process of manufacturing the sheet includes a process of impregnating the cellulose fiber into the solution including the silica and the organic solvent or the mixture solution of water and the organic solvent to manufacture the sheet.

4. The method of claim 1, wherein the process of manufacturing the sheet includes a process of passing the solution including the cellulose fiber, the silica, and the organic solvent or the mixture solution of water and the organic solvent through a homogenizer to manufacture a suspension, and performing pressure reduction to manufacture the sheet.

5. The method of claim 4, wherein the method includes the process of passing the solution including the cellulose fiber, the silica, and the organic solvent or the mixture solution of water and the organic solvent through the homogenizer by eight cycles or more.

* * * * *